United States Patent [19]

Bahadir et al.

[11] 4,387,201

[45] Jun. 7, 1983

[54] PROCESS FOR THE HOMO- AND COPOLYMERIZATION OF α-OLEFINS

[75] Inventors: Mufit Bahadir, Dinslaken; Wolfgang Payer, Wesel, both of Fed. Rep. of Germany

[73] Assignee: Ruhrchemie Aktiengesellschaft, Oberhausen, Fed. Rep. of Germany

[21] Appl. No.: 249,797

[22] Filed: Apr. 1, 1981

[30] Foreign Application Priority Data

Aug. 27, 1980 [DE] Fed. Rep. of Germany ....... 3032224

[51] Int. Cl.$^3$ .......................... C08F 4/02; C08F 10/00
[52] U.S. Cl. .................................. 526/125; 252/429 B; 526/124; 526/352; 526/909
[58] Field of Search ................ 526/124, 125, 159, 903, 526/904

[56] References Cited

U.S. PATENT DOCUMENTS

| 3,400,110 | 9/1968 | Danesse et al. | 526/125 |
| 3,404,096 | 10/1968 | Lamborn | 526/903 |
| 3,575,948 | 4/1971 | Blunt | 526/903 |
| 3,723,403 | 3/1973 | Greaver et al. | 526/903 |
| 4,133,944 | 1/1979 | Cooper et al. | 526/124 |
| 4,250,284 | 2/1981 | Delbouille et al. | 526/124 |
| 4,302,567 | 11/1981 | Bahadir et al. | 526/159 |

OTHER PUBLICATIONS

Haward et al., Polymer (1973), vol. 14, Aug.

Primary Examiner—Edward J. Smith
Attorney, Agent, or Firm—Sprung, Horn, Kramer & Woods

[57] ABSTRACT

A new catalyst for the homo- and copolymerization of α-olefins by a Ziegler type catalysis is described, the catalyst being prepared by reaction of a titanium (IV) compound with a carrier substance in the presence of a solution of at least about 0.1 weight percent of an atactic poly-α-olefin followed by reduction of the reaction product with an organoaluminum compound in an inert inorganic solvent and activation with an organoaluminum compound. The novel catalyst is useful in the preparation of extremely high molecular weight polyolefins of fine grained structures.

10 Claims, No Drawings

PROCESS FOR THE HOMO- AND COPOLYMERIZATION OF α-OLEFINS

BACKGROUND OF THE INVENTION

1. Field of the Invention

The present invention relates to a process for the preparation of homo- and copolymers of α-olefins by the use of catalyst systems whose titanium (IV) component is first reacted with carrier substances such as magnesium alcoholates or magnesium hydroxychlorides in the presence of atactic poly-α-olefins. The subsequent reduction and activation of the catalyst system, however, are carried out in the absence of atactic poly-α-olefins. In this way, a catalyst system is obtained which is distinguished by high activity. Homo- and copolymers of α-olefins prepared by the use of such a catalyst have a particularly fine-grained structure.

2. Discussion of Prior Art

The polymerization of α-olefins to the corresponding homo- and copolymers by the use of Ziegler-Natta catalysts is widely employed in the production of plastics having different technically desirable properties. Ziegler-Natta catalysts usually comprise a titanium (III) compound, which can be prepared by reduction of titanium (IV) compound or by reaction of a titanium (IV) compound with carrier substances such as magnesium alcoholates or magnesium hydroxychlorides followed by reduction, and an activator. Such catalyst systems are usually obtained by first reducing a titanium (IV) compound with organoaluminum or organomagnesium compounds to a titanium (III) compound or, after reacting the titanium (IV) compound with magnesium alcoholates or magnesium hydroxychlorides, by effecting the reduction with organoaluminum compounds. Trialkylaluminum compounds or alkylaluminum halides, for example, or mixtures thereof may be used as reducing agents. After the dissolved reducing agent has been washed out, an organoaluminum compound of the type mentioned is added to the titanium (III) compound as activator. In the case of organoaluminum compounds which are used both as reducing agent and as activator, a separate reducing step can be dispensed with. The aluminum compound is then added in a single step during the polymerization.

When this general procedure is followed and the titanium (IV) compound is reacted with magnesium alcoholates or magnesium hydroxychlorides and then reduced, catalyst systems are obtained which result in polymers of relatively large particle size. Often, however, polymers of small particle size are required in view of the further processing of the plastic. This is true especially of ultrahigh-molecular polyolefins, that is to say, those having a viscosimetrically determined molecular weight above 500,000, and in particular above 1,000,000. Such polyolefins cannot be processed into shaped articles by the techniques generally used with thermoplastics, such as extrusion or injection molding. They are therefore processed primarily by pressing and sintering. To provide assurance that additives such as colorants, antioxidants and UV stabilizers are uniformly distributed in semifinished products and finished parts, it is then necessary to employ ultra-high-molecular polyolefins in particularly finely divided form.

Since finely divided catalysts result in particulate polymers, there have been many attempts to produce catalysts of small particle size. U.S. Pat. No. 2,968,652, for example, describes a method of comminuting titanium (III) compounds of a particle size of about 25μ to a particle size of approximately 0.1 to 5μ by subjecting the crystals to ultrasonic treatment in an inert liquid medium. The fine particles so obtained are said to give within a short time higher yields of crystalline polymers than coarser catalyst particles. However, the particle size of polymers produced by the use of these catalysts still is not small enough, and the products therefore have to be subjected to subsequent size reduction. Because of the equipment needed, this method is not suited for industrial use.

Another method is described in German No. 15 95 661. Here titanium chloride particles of an average size of 0.5 to 3.0μ obtained by the reduction of titanium tetrachloride in the presence of a rubberlike active-oxygen-atoms-containing hydrocarbon polymer which contains from 0.1 to 1.0 weight percent oxygen and is dissolved in the solvent used in an amount of 0.01 to 1 part per part by weight of titanium tetrachloride is used as a catalyst component for the production of particulate polymers. Recommended are all known rubberlike hydrocarbon polymers, homopolymers or copolymers, such as polyisobutylene, ethylene-propylene copolymers, polyisoprene, polybutadiene, ethylene-propylene-dicyclopentadiene terpolymers as well as styrene-butadiene polymer which have been oxidized by the action of oxygen. Such polymers can be oxidized by grinding for a short time at elevated temperature in an oxygen atmosphere or by prolonged storage in air.

The use of the rubberlike hydrocarbon polymer containing active oxygen atoms results in the formation of a fine-grained catalyst. In practice, however, production of the hydrocarbon polymers poses difficulties. Oxygen absorption occurs by way of the polymer surface and because of the high viscosity of the product is difficult to control reproducibly so that a homogeneous distribution of the oxygen in the polymer is not assured. The same applies to analytical control. Representative sampling for the purpose of determining the oxygen content of the hydrocarbon polymer as a function of the duration of the reaction and the temperature level is possible only to a limited extent. Moreover, it should not be overlooked in this context that the activity of the catalyst can be impaired by the presence of oxygen-containing compounds.

German No. 17 95 197 describes a process for the homo- and copolymerization of olefins by the use of a mixed catalyst formed by the product of reaction of a titanium compound with a magnesium compound (component B), component A being produced by the reaction of magnesium alcoholates with tetravalent halogen-containing titanium compounds.

An advantage is said to be that the products of reaction of magnesium alcoholates with titanium (IV) halogen compounds constitute particularly active supported catalysts.

However, the use of such supported catalysts results in polymers formed of relatively coarse particles.

Thus, there has been a need for a process for the preparation of particulate polymers which does not have the drawbacks described.

SUMMARY OF THE INVENTION

Surprisingly, fine-grained polymers are obtained by a process for the homo- and copolymerization of α-olefins by the use of a catalyst system comprising microcrystalline titanium (III) compounds obtained by the reaction of a titanium (IV) compound with a carrier substance such as a magnesium alcoholate or magnesium hydroxychlorides followed by reduction of the reaction product with an organoaluminum compound in an inert organic solvent, and an organoaluminum compound as activator. In accordance with the new process, the reaction of the titanium (IV) compound with the carrier substance is carried out in the presence of a solution of at least about 0.1 weight percent atactic poly-$\alpha$-olefin, based on the solvent of said solution.

The reaction product is then freed of titanium (IV) compound used in excess and of the atactic poly-$\alpha$-olefins added by washing and is reduced and activated in the usual manner.

Atactic poly-$\alpha$-olefins are macromolecules which are formed by the polymerization of $C_4$ to $C_{20}$ monoolefins and whose side chains are arranged randomly. In the case of poly-$\alpha$-hexene for example, the side chain is formed by a butyl group. In a preferred embodiment of the invention, the poly-$\alpha$-olefins used are poly-$\alpha$-butene, poly-$\alpha$-hexene, poly-$\alpha$-octene, poly-$\alpha$-decene and poly-$\alpha$-dodecene. Generally, the poly-$\alpha$-olefins are derived from $\alpha$-olefins of 4 to 20 carbon atoms in the chain of the monomer. The solution containing the atactic poly-$\alpha$-olefins is prepared by polymerization of the monomers in the desired solvent with the aid of Ziegler catalysts such as $TiCl_3$ and $Al(C_2H_5)_3$. Solvent and olefin may be used in such weight ratio that a poly-$\alpha$-olefin solution of the desired concentration is obtained immediately. Generally the solution has a concentration of 0.1 to 90.0 weight percent. Preferably, however, solutions of higher concentration are first prepared and then diluted by the addition of more solvent until the desired poly-$\alpha$-olefin content is obtained. Polymers which are useful in the invention include non-oxygen containing atactic poly-$\alpha$-olefins. Generally speaking the atactic poly-$\alpha$-olefin is present in an amount of between 0.1 and 5 weight percent, based on the solvent.

The solutions used in accordance with the invention in the reaction of titanium (IV) compounds and carrier substance contain about 0.1 to about 5 weight percent atactic poly-$\alpha$-olefins. Mixtures of poly-$\alpha$-olefin can be used. Higher polyolefin concentrations result in smaller polymer particles than lower concentrations. Solutions containing less than about 0.1 weight percent atactic poly-$\alpha$-olefins have no effect or very little effect on the particle size of the polymer and therefore are not suited for actual use. Concentrations higher than about 5 weight percent may be used, but their effect will be negligible, and they are, therefore, avoided for economic reasons alone.

Carrier substances used in the preparation of the titanium component of the catalyst system are magnesium alcoholates of the general formula $Mg(OR)_2$, wherein R stands for identical or different hydrocarbon radicals, especially those of chain length up to 16 carbon atoms, and preferably straight-chain or branched alkyl radicals having from 1 to 10 and more particularly from 1 to 4, carbon atoms. The term magnesium alcoholates as here used includes compounds of the general formula X—Mg—OR, wherein X signifies acid moieties, and in particular halogen, carboxylate or OH, and R has the meaning given above.

Finally, magnesium hydroxychlorides, that is to say, compounds which in the ideal case correspond to the formula Mg(OH)Cl, are also used as carrier substances. However, these include also compounds in which the molar ratio between hydroxyl group and chloride is not 1:1 but varies widely and may, for example, range from 1:1 to 10:1.

Suited for use as titanium (IV) compound to be reacted with the carrier substance are not only such titanium tetrahalides as $TiCl_4$, $TiBr_4$ and $TiI_4$ but also mixed halotitanic acid esters such as $Ti(OR)_3Cl$, $Ti(OR)_3Br$, $Ti(OR)_2Cl_2$, $Ti(OR)_2Br_2$, $Ti(OR)_2I_2$, $Ti(OR)Cl_3$ and $Ti(OR)Br_3$, where R stands for aliphatic and/or aromatic hydrocarbon radicals.

The product of reaction of titanium (IV) compound and carrier substance is then washed to free it from excess titanium (IV) compound and the atactic poly-$\alpha$-olefins. For the ensuing reduction of the titanium (IV) compound so obtained, trialkylaluminum compounds such as $Al(C_2H_5)_3$, $Al(C_3H_7)_3$ and $Al(i-C_4H_9)_3$, isoprenylaluminum, and alkylaluminum halides such as $Al(C_2H_5)_2Cl$, $Al(C_2H_5)Cl_2$, $Al(C_3H_7)_2Cl$, $Al(C_3H_7)Cl_2$, $Al(i-C_4H_9)_2Cl$ and $Al(n-C_4H_9)Cl_2$, as well as mixtures of different aluminum compounds of the type mentioned can be used.

Suitable activators for the catalyst system are the aluminum compounds used to reduce the titanium (IV) compounds.

The catalyst system may be prepared in any inert liquid solvent in which the titanium (IV) compounds, the organic aluminum compounds and the atactic poly-$\delta$-olefins are jointly soluble.

Such solvents are saturated aliphatic hydrocarbons such as butane, hexane, heptane, $C_8$ to $C_{12}$ hydrocarbon fractions, cycloaliphatic hydrocarbons, aliphatic or aromatic halogenated hydrocarbons, or mixtures thereof. The practical implementation of the process in accordance with the invention is very simple and may be varied over a wide range. An example of the successive process steps is given below without the invention being limited to this particular embodiment.

The desired atactic poly-$\alpha$-olefin is first prepared by polymerization of $\alpha$-olefins in the presence of titanium (III) compounds and organoaluminum compounds at temperatures ranging from 30° to 120° C. and pressures ranging from 1 to 100 bars. The desired concentration can then be obtained in the finished product by the addition of solvent.

The titanium (IV) compound is reacted with the carrier substance in the presence of the computed amount of atactic poly-$\alpha$-olefin by first introducing the suspending agent which dissolves the atactic poly-$\alpha$-olefin and then adding the titanium (IV) compound to the mixture with stirring at temperatures which preferably range from 85° to 120° C. On completion of such addition, the titanium (IV) compound so obtained is washed with solvents at room temperature and then reduced by the addition of the organoaluminum compound or compounds, freed of excess reducing agent by washing, and finally activated by the addition of organoaluminum compound. For this purpose, up to 100 moles of organoaluminum compounds is used per mol of titanium (III) compound.

The catalyst so prepared can then be used directly in the homo- and copolymerization of $\alpha$-olefins, especially those of 2 to 12 carbon chain length such as ethylene, propylene, 1-butene, 1-hexene, 1-octene, 1-decene and 1-dodecene. Polymerization takes place under conditions which are typical for the Ziegler-Natta process, that is to say, at temperatures ranging from 20° to 150° C., and preferably from 50° to 100° C., and pressures of up to 50 bars and preferably between 2 and 8 bars. The polymerization may be carried out in solution, is suspension or in the vapor phase. The polymer obtained is distinguished by fine particle-size distribution, as desired for further processing.

EXAMPLES OF TESTS

1. Preparation of atactic poly-α-olefins

Poly-α-hexene

In a 2-liter reaction flask with heating jacket which has been scavenged with nitrogen, there are added to a solution heated to 40° C. of 4.0 moles hexane (about 332 g) in 500 ml of a hydrocarbon fraction (boiling range, 140° to 170° C.) 1.6 millimoles TiCl$_3$ and 16 millimoles isoprenylaluminum. For polymerization, the reaction mixture is held with constant stirring for 6 hours at 40° C. and for another 16 hours at room temperature. The degree of conversion is 97.4% of theory, as determined by means of the iodine number. A concentration of 12 weight percent is then obtained in the reaction mixture by the addition of solvent. The kinematic viscosity, as measured by the Ubbelohde viscosimeter (DIN 51 562) is $U_{20}=4,100$ centistokes.

2. Preparation of supported catalyst 2. (a) Comparative example

In a dry three-neck flask equipped with agitator, reflux condenser and internal thermometer and scavenged with nitrogen, 5.5 moles (630 g) magnesium ethylate is suspended in 4.5 liters of a hydrocarbon mixture (boiling range, 140° to 170° C.) and mixed with 7.1 moles (790 ml) TiCl$_4$. The suspension is then heated with stirring and refluxed for 12 to 16 hours. On cooling, the precipitate is separated from the suspending agent by decanting and repeatedly washed with a hydrocarbon such as hexane or with suspending agent. For further processing (reduction and activation), the precipitate is again suspended in a hydrocarbon and the titanium content is determined analytically.

2. (b) Preparation of supported catalyst in the presence of atactic poly-α-hexene In a dry three-neck flask equipped with agitator, reflux condenser and internal thermometer and scavenged with nitrogen, 5.5 moles (630 g) magnesium ethylate is suspended in 4.5 liters of a hydrocarbon mixture (boiling range, 140° to 170° C.) containing 8.3 g atactic poly-α-hexene in solution and mixed with 7.1 moles (790 ml) TiCl$_4$. The suspension is then heated with stirring and refluxed for 12 to 16 hours. On cooling, the precipitate is separated from the suspending agent and the atactic poly-α-olefin and repeatedly washed with a hydrocarbon such as hexane or with suspending agent. For further processing (reduction and activation), the precipitate is again suspended in a hydrocarbon and the titanium content is determined analytically.

3. Polymerization (batchwise)

3. (a) Comparative example 0.5 millimoles (based on the titanium) of the supported-catalyst component prepared in accordance with Example 2 (a) is introduced into a dry 3-liter pressure vessel with a heating jacket which has been scavenged with nitrogen and which contains 2 liters of a hydrocarbon mixture. Reduction and activation are effected by the addition of 10 millimoles aluminumisoprenyl with stirring and heating to 80° C. Ethylene is then injected up to a total pressure of 4 bars and this pressure is maintained for the 5-hour duration of the reaction by the addition of ethylene. Polymerization is terminated by the addition of isopropanol. 555 g polyethylene is obtained. Catalyst requirement: 0.9 mg-atom Ti/kg polyethylene.

3. (b) Polymerization by the use of a supported-catalyst component prepared in the presence of atactic poly-α-hexene 0.5 millimoles (based on the titanium) of the supported-catalyst component prepared in accordance with Example 2 (b) in the presence of atactic poly-α-hexene is introduced into a 3-liter pressure vessel with a heating jacket which has been scavenged with nitrogen and which contains 2 liters of a hydrocarbon mixture. Reduction and activation are effected by the addition of 10 millimoles aluminumisoprenyl with stirring and heating to 80° C. Ethylene is then injected up to a total pressure of 4 bars and this pressure is maintained for the 5-hour duration of the reaction by the addition of ethylene. Polymerization is terminated by the addition of isopropanol. 830 g polyethylene is obtained. Catalyst requirement: 0.6 mg-atom Ti/kg polyethylene.

The results of these tests are presented in the table which follows.

TABLE

SCREEN ANALYSIS OF POLYETHYLENE POLYMER (DIN 4188)

| Example | Poly-α-olefin used | Size fraction (dia., mm) in weight percent | | | | | |
|---|---|---|---|---|---|---|---|
| | | >1.0 | 1.0–1.5 | 0.5–0.25 | 0.25–0.1 | 0.1–0.063 | <0.063 |
| 3a | — | 3.0 | 7.0 | 49.5 | 40.0 | 0.5 | — |
| 3b | Poly-α hexene | 1.5 | 1.5 | 17.0 | 79.0 | 1.0 | — |

DIN = DEUTSCHE INDUSTRE NORM

What is claimed is:

1. In a process for the homo- and copolymerization of α-olefins by the use of a catalyst comprising a microcrystalline titanium (III) compound prepared by reaction of a titanium (IV) compound with a magnesium containing carrier substance selected from the group consisting of a magnesium alcoholate and magnesium hydroxychloride followed by reduction of the reaction product with an organo-aluminium compound in an inert organic solvent, and activation with an organoaluminum compound, the improvement wherein the reaction of the titanium (IV) with said carrier substance is carried out in the presence of a solution of at least about 0.1 weight percent atactic poly-α-olefin of a C$_4$–C$_{20}$ monoolefin based on the solvent of said solution.

2. A process according to claim 1, wherein said atactic poly-α-olefin is present in an amount of 0.1 to about 5 weight percent, based on the solvent.

3. A process according to claim 2, wherein said poly-α-olefin is poly-α-butene, poly-α-hexene, poly-α-octene, poly-α-decene and poly-α-dodecene or a mixture thereof.

4. A process according to claim 1, wherein the reduction and activation are carried out in the absence of atactic poly-α-olefin.

5. A process according to claim 1, wherein said atactic poly-α-olefin is a non-oxygen containing atactic poly-α-olefin.

6. A process according to claim 1, wherein said titanium (IV) compound is a titanium tetrahalide or mixed halo titanic acid ester.

7. A process according to claim 6, wherein said organoaluminum compound is a trialkylaluminum compound, isoprenylaluminum or an alkyl aluminum halide or a mixture thereof.

8. A process according to claim 7, wherein said activator is a trialkylaluminum compound, isoprenylaluminum or an alkyl aluminum halide.

9. A process according to claim 1, wherein said carrier is a magnesium alcoholate of the formula:

$$Mg(OR)_2$$

wherein
R stands for identical or different hydrocarbon radicals of up to 16 carbon atoms.

10. A process according to claim 1, wherein said carrier substance is a magnesium alcoholate of the formula:

$$X-Mg-Or$$

wherein
X signifies an acid moiety and R represents a hydrocarbon radical having up to 16 carbon atoms.